United States Patent Office 3,499,000
Patented Mar. 3, 1970

3,499,000
1,3-DISUBSTITUTED-$\Delta^2$-1,2,4-TRIAZOLIN-5-ONE-4-ACETIC ACIDS
Andre L. Langis, Montreal, Quebec, Canada, assignor to American Home Products Corporation, New York, N.Y., a corporation of Delaware
No Drawing. Filed Aug. 4, 1967, Ser. No. 658,326
Int. Cl. C07d 55/06; A61k 27/00
U.S. Cl. 260—308                                    9 Claims

ABSTRACT OF THE DISCLOSURE

There are disclosed herein 1,3-diphenyl-, 3-(4'-chlorophenyl) - 1 - phenyl-, 3-(1'-naphthyl)-1-phenyl-, and 3-benzhydryl-1-phenyl-$\Delta^2$-1,2,4-triazolin-5-one - 4 - acetic acids and, as intermediates, their corresponding ethyl esters and 1,3-diphenyl-, 3-(4'-chlorophenyl)-1-phenyl-, 3-(1'-naphthyl)-1-phenyl-, and 3-benzhydryl-1-phenyl-$\Delta^2$-1,2,4-triazolin-5-ones. The above acids have anti-inflammatory activities and methods for their preparation and use are also disclosed.

The present invention relates to new 1,3-disubstituted-$\Delta^2$-1,2,4-triazolin-5-one-4-acetic acids as well as to novel intermediates used in their preparation.

The compounds of this invention possess anti-inflammatory activities when administered locally or orally, and are useful in the treatment of inflammatory conditions. For local administration they may be formulated in the form of solutions, creams, or lotions, containing 0.5–5.0 percent of the active ingredient and may be applied locally to the inflamed area several times a day. For oral administration, they may be formulated with excipients such as, starch, lactose, magnesium stearate or magnesium silicate in dosage forms such as tablets, or capsules containing from 25 to 250 mg. each of the active ingredient.

More specifically, the compounds of this invention may be represented by Formula I:

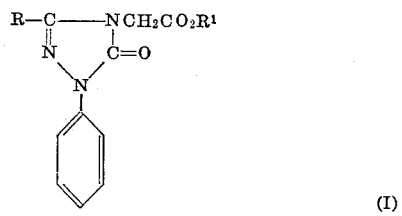

(I)

in which R represents an aromatic group such as the phenyl, p-chlorophenyl or naphthyl group, or an aralkyl group such as the diphenylmethyl group, and $R^1$ represents hydrogen or a lower alkyl group such as the methyl, ethyl or propyl group.

The compounds of this invention may be conveniently prepared by reacting an aroyl or an aralkoyl halide, preferably the chloride of the formula RCOCl in which R has the significance defined above with urea to obtain the intermediate aroyl or aralkoyl urea of the formula RCO—NH—CO—NH$_2$ (II) in which R has the significance defined above. Examples of such substituted ureas are benzoyl urea, p-chlorobenzoyl urea, naphthoyl urea, or diphenylacetyl urea. The latter substituted urea of Formula II is then reacted with phenyl hydrazine to obtain the corresponding 3-substituted-1-phenyl-$\Delta^2$-1,2,4-triazolin-5-one of Formula III. The latter compound is then reacted with a lower alkyl haloacetate of the formula XCH$_2$COOR$^1$ in which X represents a halogen with a molecular weight greater than 19 and $R^1$ is as defined above, such as, for example, ethyl chloroacetate in the presence of an alkali metal lower alkoxide such as, for example, sodium methoxide to obtain the corresponding 3-aryl- or 3-aralkyl-1-phenyl-$\Delta^2$-1,2,4-triazolin-5-one-4-acetic acid lower alkyl ester, such as, for example, 3-aroyl- or 3-aralkyl-4-carbethoxymethyl-1-phenyl-$\Delta^2$-1,2,4-triazolin-5-one (I., $R^1$=lower alkyl). Hydrolysis of those last-named esters yields the corresponding 3-aryl- or 3-aralkyl-1-phenyl-$\Delta^2$-1,2,4-triazolin-5-one - 4 - acetic acids (I., $R^1$=H).

The following examples and formulae in which X, R and $R^1$ have the significance defined above will illustrate this invention. The composition of compounds is confirmed by elemental analysis.

R—COCl + H$_2$N—CONH$_2$ ⟶ R—CONHCONH$_2$ (II)

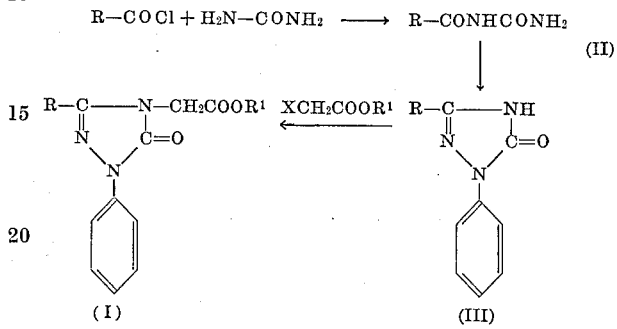

EXAMPLE 1

1,3-diphenyl-$\Delta^2$-1,2,4-triazolin-5-one

Benzoyl urea (13.3 g., 0.075 mole) and phenyl hydrazine (8.1 g., 0.075 mole) are immersed into an oil bath at 155° C. The temperature is raised to 175° C. over ½ hour and held there for 5 hours. The solid is filtered and washed with ether to give the crude title compound with M.P. 213–219° C. Three recrystallizations from alcohol raise the melting point to 233–234° C.

EXAMPLE 2

4-carbethoxymethyl-1,3-diphenyl-$\Delta^2$-1,2,4-triazolin-5-one

To a solution of 11.85 g. (0.05 mole) of 1,3-diphenyl-1,2,4-triazolin-5-one in 100 ml. of methanol are added 2.7 g. of sodium methoxide. The reaction mixture is stirred and refluxed for 2.5 hours. 9.1 g. of ethyl bromoacetate are added dropwise and the mixture is heated to reflux for 18 hours. After filtration, the solvent is evaporated under reduced pressure. The title compound is obtained as an oil, $\nu_{max.}^{CHCl_3}$ 1752, 1710, 1375 and may be used without further purification for the subsequent hydrolysis.

EXAMPLE 3

1,3-diphenyl-$\Delta^2$-1,2,4-triazolin-5-one-4-acetic acid 1,3-diphenyl-4-carbethoxymethyl-$\Delta^2$-1,2,4-triazolin - 5 - one (2.0 g.) is dissolved in 20 ml. of formic acid and 1.0 g. of methane sulfuric acid is added to the solution. After heating to reflux for 5 hours, the solution is evaporated to dryness under reduced pressure. The product is dissolved in chloroform and the solution is washed with water, dried over sodium sulfate and the solvent evaporated. The title compound is obtained with M.P. 196–198° C. after crystallization from ethanol.

EXAMPLE 4

3-(4'-chlorophenyl)-1-phenyl-$\Delta^2$-1,2,4-traizolin-5-one p-Chlorobenzoyl urea (15.4 g., 0.0825 mole) and 8.9 g. (0.0825 mole) phenylhydrazine in 150 ml. Decalin are heated to reflux for 12 hours. A solid separates on cooling. It is collected and recrystallized from nitromethane: methanol:chloroform to give the title compound with M.P. 284–286° C. after sublimation at 250–255° C. and 0.5–1 mm. Hg pressure.

EXAMPLE 5

4-carbethoxymethyl-3-(4'-chlorophenyl)-1-phenyl-
Δ²-1,2,4-triazolin-5-one

To a solution of 67.6 g. (0.248 mole) of 1-phenyl-3-(4'-chlorophenyl)-Δ²-1,2,4-triazolin-5-one in 750 ml. of dry methanol there are added 13.4 g. of sodium methoxide, and the mixture is heated to reflux for 2.5 hours. Ethyl bromoacetate (45.1 g.) is added dropwise to the mixture which is refluxed for 9 hours. The inorganic salts are collected and the filtrate is evaporated to dryness under reduced pressure. The product is dissolved in chloroform and the solution is washed with water (2×25 cc.) and dried over sodium sulfate. The solvent is evaporated to yield the title compound with M.P. 122–123° C. after crystallization from ethanol.

EXAMPLE 6

3-(4'-p-chlorophenyl) 1-phenyl-Δ²-1,2,4-triazolin-5-one-4-acetic acid

A solution of 9.0 g. of 4-carbethoxymethyl-3,(4'-chlorophenyl)-1-phenyl-Δ²-1,2,4-triazolin-5-one in a mixture of 100 ml. of formic acid and 5 ml. of methane sulfonic acid is heated to reflux for 7 hours and then cooled. The crystals are collected and recrystallized from ethanol to give the title compound with M.P. 190–192° C.

EXAMPLE 7

3-(1'-naphthyl)-1-phenyl-Δ²-1,2,4-triazolin-5-one 1-naphthyloylurea (26.8 g., 0.125 mole) and 13.5 g. (0.125 mole) of phenylhydrazine in 175 ml. of Decalin are heated to reflux for 8 hours. The crystals separating upon cooling are collected and washed with ether. The product is recrystallized from a mixture of nitromethane, methanol and chloroform to yield the title compound with M.P. 257–260° C.

EXAMPLE 8

4-carbethoxymethyl-3-(1'-naphthyl)-1-phenyl-
Δ²-1,2,4-triazolin-5-one

To a solution of 12.75 g. of 3-(1'-naphthyl-1-phenyl-Δ²-1,2,4-triazolin-5-one in 100 ml. of dry methanol are added 2.4 g. sodium methylate. The reaction mixture is stirred and refluxed for 2.5 hours. Ethyl bromoacetate (8.05 g.) is added dropwise and the mixture is stirred and refluxed for 9 hours. The inorganic salts are collected and the filtrate is evaporated to dryness under reduced pressure. The product is dissolved in chloroform. The solution is washed with water, dried over sodium sulfate, and the solvent evaporated. The residue is recrystallized from ethanol to yield the title compound with M.P. 103–106° C.

EXAMPLE 9

3-(1-naphthyl)-1-phenyl-Δ²-1,2,4-triazolin-5-one-4-acetic acid

A solution of 9.0 g. of 4-carbethoxymethyl-3-(1'-naphthyl)-1-phenyl-Δ²-1,2,4-triazolin-5-one in a mixture of 100 ml. of formic acid and 5 ml. of methanesulfonic acid is heated to reflux for 7 hours. It is then evaporated to dryness under reduced pressure. The product is recrystallized from a mixture of acetone and hexane to give the title compound with M.P. 190–192° C.

EXAMPLE 10

3-benzhydryl-1-phenyl-Δ²-1,2,4-triazolin-5-one

Diphenylacetyl urea (14.9 g., 0.058 mole) and (6.33 g., 0.058 mole) of phenylhydrazine in 95 ml. of Decalin are heated to reflux for 8 hours. The crystals are collected and washed with ether. The product is recrystallized fom methanol to give the title compound with M.P. 204–208° C.

EXAMPLE 11

3-benzhydryl-4-carbethoxymethyl-1-phenyl-Δ²-1,2,4-triazolin-5-one

To a solution of 71.0 g. (0.21 mole) of 3-benzhydryl-1-phenyl-Δ²-1,2,4-triazolin-5-one in 1,000 ml. of methanol are added 11.7 g. of sodium methoxide. The reaction mixture is stirred and refluxed for 2.5 hours. Ethyl bromoacetate (36.2 g.) is added dropwise and the mixture is heated to reflux for 18 hours. After cooling, the crystals are collected and recrystallized from ethanol to give the title compound with M.P. 182–184° C.

EXAMPLE 12

3-benzhydryl-1-phenyl-Δ²-1,2,4-triazolin-5-one-4-acetic acid

A solution of 8.3 g. (0.02 mole) of 3-benzhydryl-4-carbethoxymethyl-1-phenyl-Δ²-1,2,4-triazolin-5-one in a mixture of 100 ml. of formic acid and 5 ml. of methanesulfonic acid is heated to reflux for 10 hours. It is evaporated to dryness under reduced presure. The residue is dissolved in chloroform and the solution washed with water (3×15 cc.). The chloroform solution is dried over sodium sulfate and evaporated under reduced pressure. The residue is recrystallized from a hexane-methanol mixture to give the title compound with M.P. 194–196° C.

I claim:
1. A compound of the formula

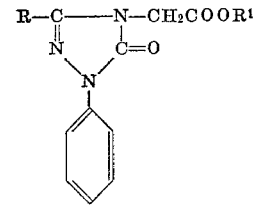

wherein R is selected from the group which consists of phenyl, p-chlorophenyl, naphthyl and diphenylmethyl; and R¹ is selected from the group which consists of hydrogen and lower alkyl.

2. 1,3-diphenyl-Δ²-1,2,4-triazolin-5-one-4-acetic acid, as claimed in claim 1.

3. 3 - (4' - chlorophenyl)-1-phenyl-Δ²-1,2,4-triazolin-5-one-4-acetic acid, as claimed in claim 1.

4. 3-(1'-naphthyl)-1-phenyl-Δ²-1,2,4-triazolin - 5 - one-4-acetic acid, as claimed in claim 1.

5. 3-benzhydryl-1-phenyl-Δ²-1,2,4 - triazolin - 5 - one-4-acetic acid, as claimed in claim 1.

6. 4-carbethoxymethyl-1,3-diphenyl-Δ²-1,2,4 - triazolin-5-one, as claimed in claim 1.

7. 4 - carbethoxymethyl-3-(4'-chlorophenyl)-1-phenyl-Δ²-1,2,4-triazolin-5-one, as claimed in claim 1.

8. 4-carbethoxymethyl - 3 - (1'-naphthyl)-1-phenyl-Δ²-1,2,4-triazolin-5-one, as claimed in claim 1.

9. 3 - benzhydryl-4-carbethoxymethyl - 1 - phenyl-Δ²-1,2,4-triazolin-5-one, as claimed in claim 1.

References Cited

FOREIGN PATENTS 971,606   9/1964   Great Britain.

ALTON D. ROLLINS, Primary Examiner

U.S. Cl. X.R.

260—553; 424—269